Nov. 21, 1933.  I. ELLIOTT  1,935,770
MACHINE FOR COOKING PRETZELS
Filed Jan. 14, 1929    4 Sheets-Sheet 1
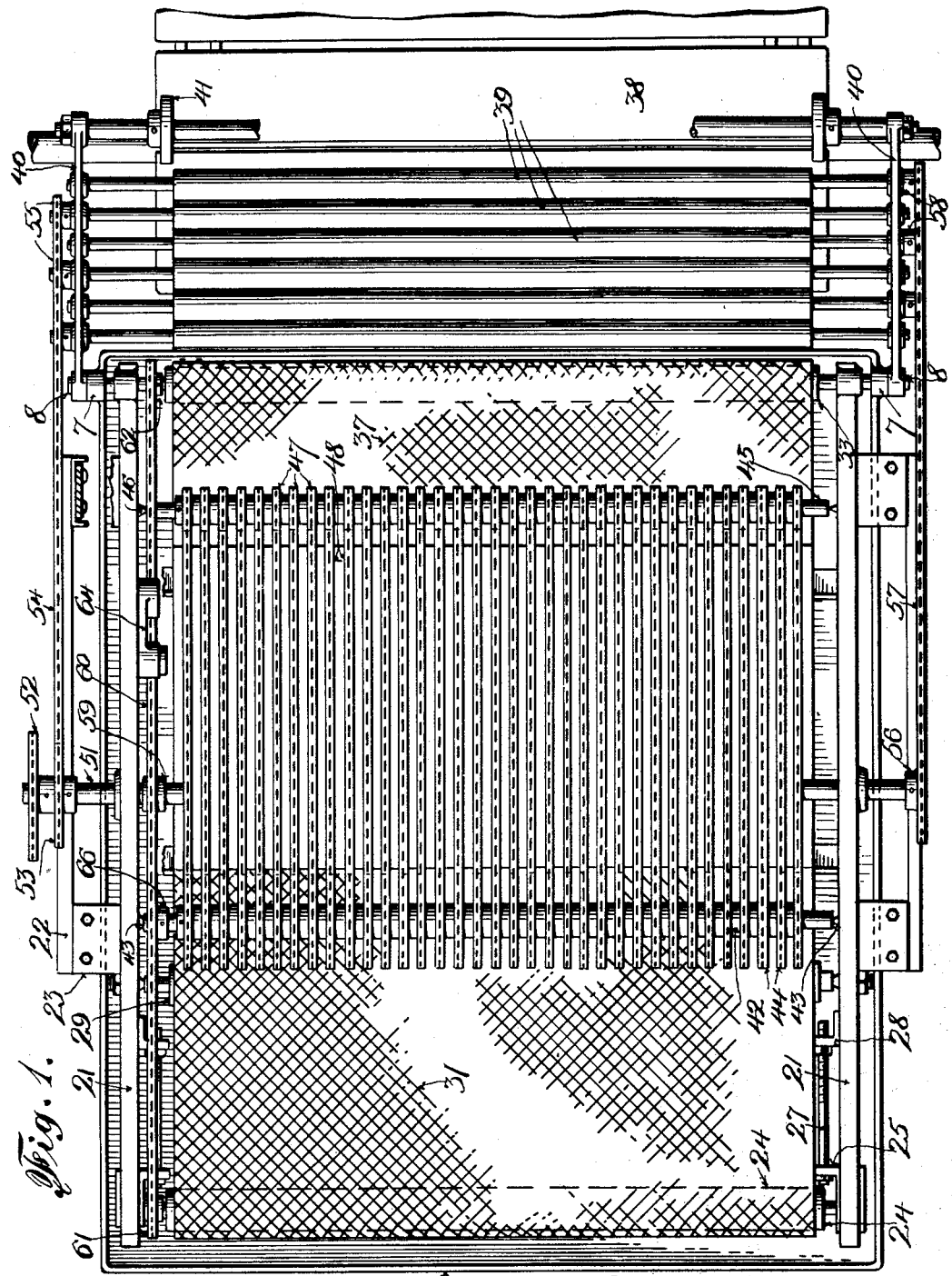

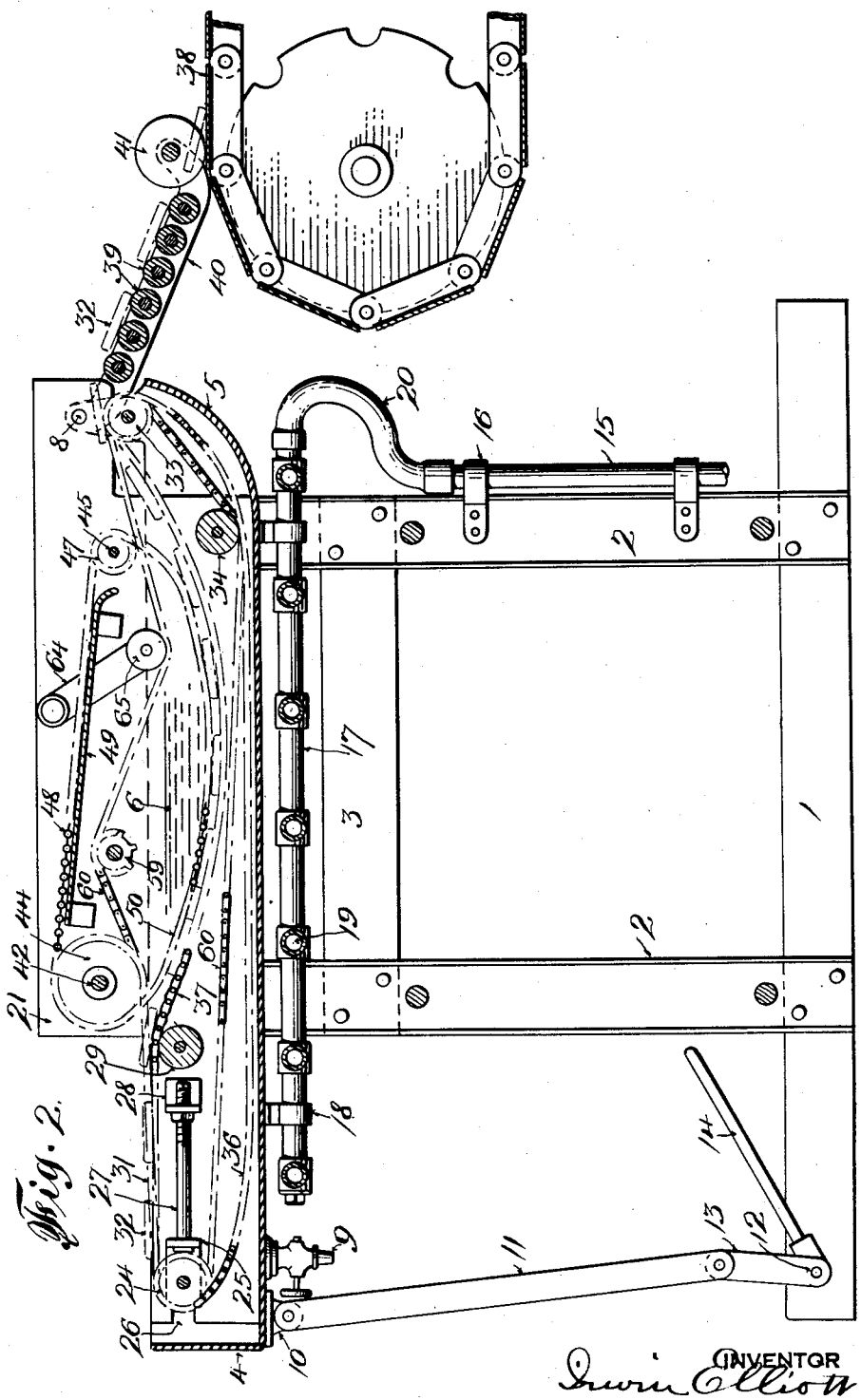

Nov. 21, 1933.   I. ELLIOTT   1,935,770
MACHINE FOR COOKING PRETZELS
Filed Jan. 14, 1929   4 Sheets-Sheet 3
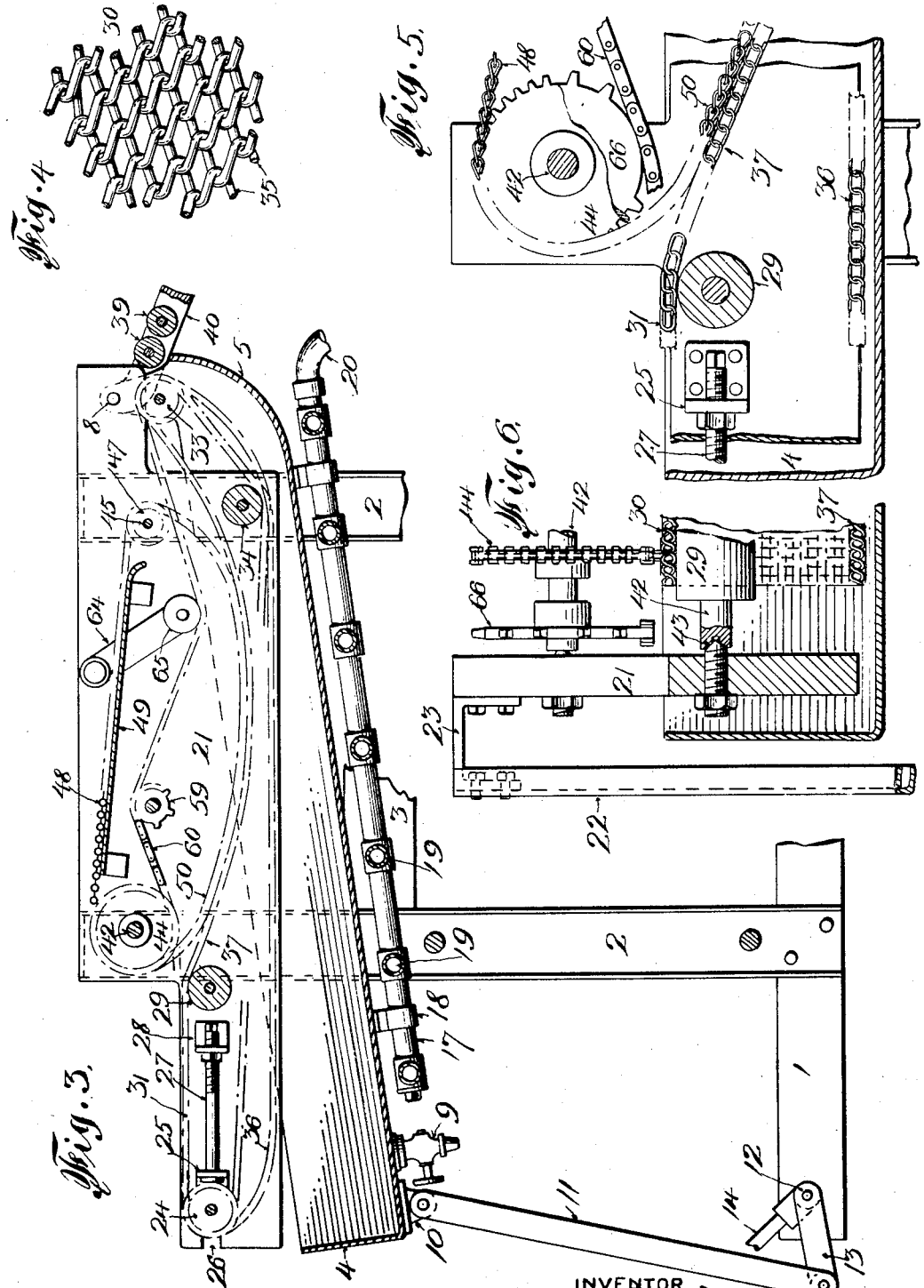
INVENTOR
Irwin Elliott
BY
Charles G. Newsley
ATTORNEY Nov. 21, 1933.   I. ELLIOTT   1,935,770
MACHINE FOR COOKING PRETZELS
Filed Jan. 14, 1929   4 Sheets-Sheet 4
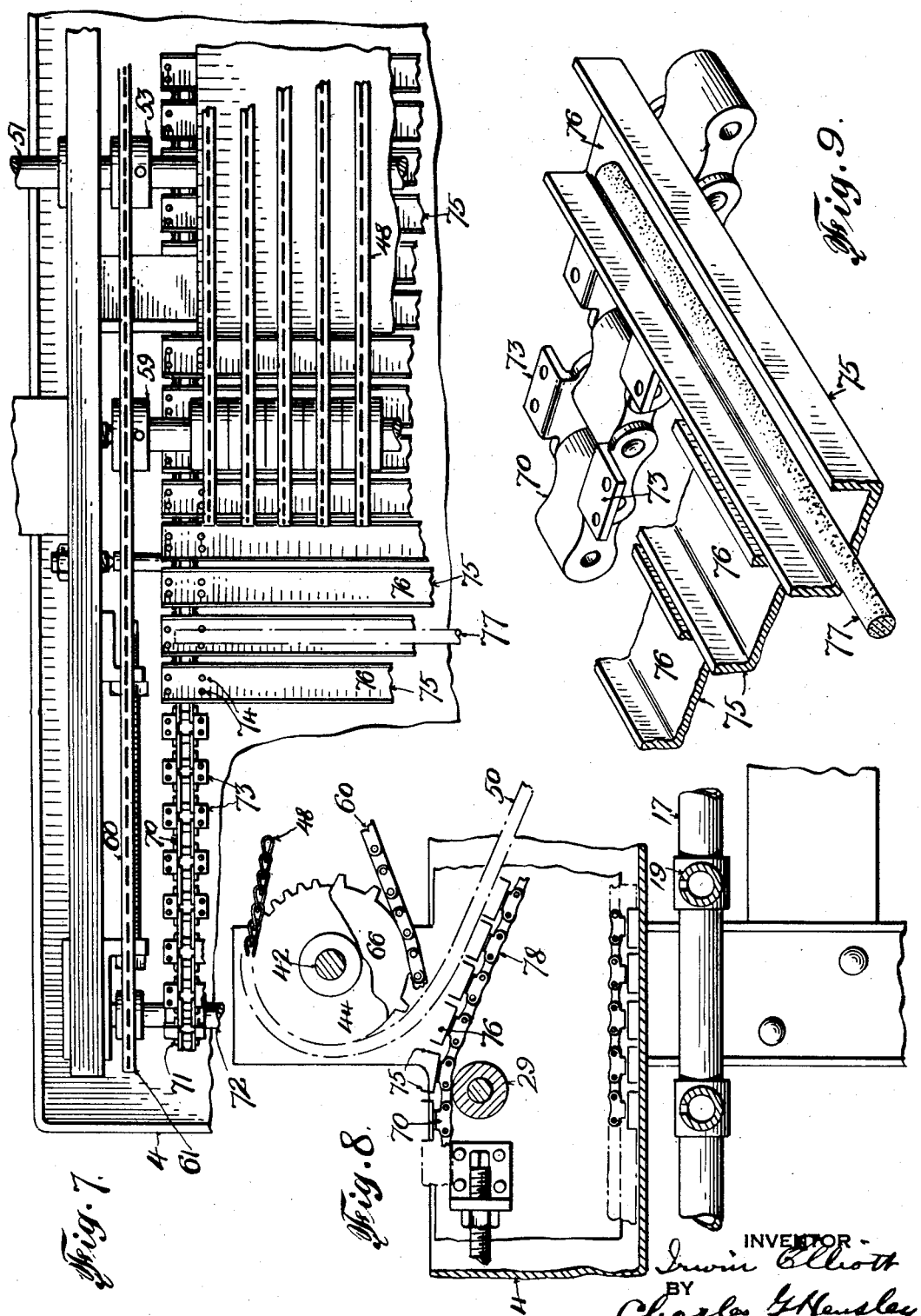

Patented Nov. 21, 1933

1,935,770

UNITED STATES PATENT OFFICE 1,935,770

MACHINE FOR COOKING PRETZELS

Irwin Elliott, Bronx, N. Y.

Application January 14, 1929. Serial No. 332,503

4 Claims. (Cl. 53—7)

The present machine is adapted for cooking pretzels although I do not intend to be understood as limiting the present case to the application of my machine to this specific purpose. I will describe the same, however, as embodied and used for cooking pretzels.

In the manufacture of pretzels by the use of automatic machinery, it is the present practice to convey the dough shapes or individual pieces of dough from which the pretzels are made and while in the soft or plastic condition through a liquid which is heated sufficiently to partially cook the dough, and to put it into the condition necessary to form the hard outer shell or crust common with pretzels. After the shapes or pieces of dough have thus been cooked in the liquid bath, they are conveyed onto the traveling member of an oven so that they may be conveyed through the oven wherein they are baked. One object of the present invention is to provide a simple and efficient mechanism for automatically transporting the pieces of dough into, through and out of the liquid in which they are cooked in such manner that each piece will lie on the conveyor separated from the others, so that they will not adhere one to the other and so that the shape will not be altered while going through the cooking operation.

The conveying device in the present case consists, primarily of an endless device for supporting and conveying the dough through the liquid in the cooking tank which endless conveyor in one form is made of a woven wire fabric disposed in the form of a traveling belt. This belt has a supporting run which is slacked to form a loop or sagging portion which is adapted to convey the dough down into the liquid and thence out again. Co-operating with this conveying belt there is a member above it which is endless and which is, preferably, composed of a number of small, light units having a lower run which is adapted to sag so that it rests lightly upon the dough which is supported on the lower conveying member. This upper member acts by gravity to rest lightly on the dough and it travels at the same rate of speed as the lower member, so that the dough is not displaced from the lower or conveying member while being carried through the liquid, but instead each piece remains in the same position on the lower conveyor as when it is fed thereto, until such time as the cooking operation has set the dough or rendered it sufficiently stiff to prevent its change of shape in the subsequent operations.

Various devices have been proposed, such as revolving brushes, for keeping the dough in place on the conveyor, but the present device is adapted to perform the function without deforming the pieces of dough, so that they emerge from the cooking device in the same shape as when supplied thereto. This is due to the fact that the upper member rests lightly by gravity upon the pieces of dough and upon the lower conveyor member while traveling at the same rate of speed therewith. Any variations in the thickness of the pieces of dough will not cause them to be flattened or compressed by the upper guiding member as is the case with positively acting devices such as heretofore been used.

The upper guiding member being in the form of a slacked or drooping run, will conform to the various thicknesses of the individual pieces of dough, this run being of a flexible nature, allowing different portions to be separated different degrees from the lower conveying member in accordance with the varying thicknesses of the individual pieces of dough. The light pressure caused by the weight of the local portion of this upper member is sufficient to keep the individual pieces of dough in proper position on the conveyor without undue pressure and without distorting them.

Another object of my invention is to provide a liquid cooking tank having suitable means for heating and with simple means for rocking the tank in order to drain the contents from one end thereof. The tank is adapted to be rocked without disturbing the conveyor portion of the device.

I have shown my invention in two different forms in one of which the conveyor has an open or unobstructed surface to receive articles of irregular shape in any position thereon, and this form may be preferred for handling pretzels. I have shown another form of the invention in which channel shaped trays are mounted on the conveyor to receive and hold strips of dough such as pretzel sticks are made from. These strips, because of their shape, may be more definitely retained from contact with each other by conveying them in the separate trays. In this construction the upper or retaining member forms a temporary cover for the pocket in each of the channel trays to prevent the displacement of the dough while it is being cooked. Other features and advantages will be set forth in the detailed description of my invention.

In the drawings forming part of this application,

Figure 1 is a plan view of a cooking machine embodying my invention in the prefrred form, Figure 2 is a vertical, sectional view through the machine, Figure 3 is a vertical, sectional view of a portion of the machine on a smaller scale, and showing the tank tilted for the discharge of the liquid, Figure 4 is a plan view showing the construction of the conveying member or belt, Figure 5 is a detailed, sectional view illustrating the manner in which the upper and lower members co-operate.

Figure 6 is a cross sectional view showing part of the operating mechanism and the method of supporting the same in the tank, Figure 7 is a plan view of a portion of a machine showing my invention in a modified form, Figure 8 is a sectional view of the form of machine shown in Figure 7, and Figure 9 is a perspective view showing portions of the conveyer.

I will first describe the form of machine shown in Figures 1 to 6 inclusive. This form, while adapted for various purposes, may be conveniently used for cooking pretzels which are, of course, more or less irregular in shape, but have no tendency to roll. In this form of the machine I have shown a frame composed of a base 1 having uprights 2 extending upwardly therefrom and spaced from each other both lengthwise and crosswise of the machine to form a support for the operating parts thereof, and these standards or supports are connected with each other by suitable beams 3 to unite them in a rigid structure.

The tank for holding the liquid in which the dough is cooked is, in the full embodiment of my invention, pivotally mounted at one end to permit the tank to be rocked. I have shown a tank 4 of substantially rectangular shape with one end 5 curved or rounded. This tank, which is simply a container having an open top, is adapted to hold the body of liquid 6 in which the dough is submerged while undergoing the cooking operation, the liquid in the tank being heated, as will be hereinafter pointed out. The tank is provided adjacent one end with bosses 7 which are journaled on the shaft 8 which extends crosswise of the machine and which is mounted in the frame members. The tank is adapted to pivot from the shaft 8 whereby it may be rocked to an inclined position, as shown in Figure 3. The tank is provided with a suitable valve 9 to which a hose may be connected for draining off or discharging from the tank the liquid contained therein at the end of the period of operation thereof. On the end of the tank away from the pivotal point there is a bracket 10 attached to the bottom and to this is pivoted a link 11 which is pivoted to a lever arm 13 which rocks on the pin 12 mounted in the base 1 of the machine. The lever arm 14 is fixed to this pin 12 so that when this lever arm is manually operated from the position shown in Figure 2 to the position shown in Figure 3 it will lower the left hand end of the tank, the latter rocking from the shaft 8. This will cause the liquid to flow toward the lower end of the tank and permit it to be withdrawn or discharged through the valve 9.

I have shown a pipe 15 for supplying gas to the burners, strapped by means of the straps 16 to the stationary frame and this pipe is connected with a longitudinally extending pipe 17 which is mounted by means of the brackets 18 on the under side or bottom of the tank.

Branch pipes 19 extending outwardly from the pipe 17 and provided with suitable burner holes form the burner from which gas flames will rise against the bottom of the tank and supply the necessary heat for cooking the dough. The burners and the supply pipe 17 being mounted on the tank, are adapted to rock with it and to permit this movement the connecting member 20 is flexible and is formed in a loop, as shown in Figure 2, to allow the pipe 17 to move when the tank is rocked in relation to the stationary pipe 15 on the frame.

The dough is adapted to be fed onto the conveyor at the left hand end of the machine, as viewed in Figures 2 and 3, and to be discharged from the right hand end thereof upon a conveyor which latter is adapted to convey the pieces of dough after they have been cooked in the liquid through a suitable baking oven (not shown), so that the baking operation immediately follows the cooking operation in accordance with common practice. There is a frame for supporting the mechanical parts of the machine in position over the tank in such manner as to permit the tank to be rocked in the manner described without interfering with the mechanical parts. I have shown vertically disposed plates 21 arranged at opposite sides of the machine and mounted on the upper ends or extensions 22 of the several posts 2 of the frame as shown in Figure 6, these plates depending from the brackets 23 which are mounted on the posts so that the plates extend downwardly and into the tank. The device for actually supporting the pieces of dough and for conveying them to the liquid in the tank is constructed as follows:

Adjacent one end of the tank there is a roller 24 having its shaft journaled in blocks 25 which are adjustable lengthwise of the plates 21 in the slots 26 thereof, the roller being adapted to be adjusted by means of the bolts 27 which are connected at one end with the bearing blocks 25 and at their opposite ends they are threaded through the brackets 28 which are stationarily mounted on the plates 21. By adjusting the bolts 27 the roller 24 may be moved horizontally to alter the slack in the conveying member. To the right of the roller 24 there is another roller 29 which serves as an idler to support in conjunction with the roller 24 the flexible conveying member 30 in the form of a short, horizontal run 31 where the pieces of dough may be fed thereon, as shown at 32 in preparation to their passage through the liquid. Adjacent the opposite end of the tank there is another roller 33 around which the endless conveying member 30 is adapted to travel. There is a fourth roller 34 disposed near the bottom of the tank and near the same end as the roller 33 and the flexible conveying member is adapted to pass under this last roller and thence back to the roller 24. The conveying member 30 is endless and flexible and for this purpose I have shown in Figures 1 to 6 inclusive a belt made of woven wire, the construction of which is more clearly illustrated in Figure 4. This belt is formed of well known woven wire consisting of a number of spiral wires 35 interlocked with each other to constitute a belt which is flexible and with the mesh sufficiently close to support the pieces of dough so that they will not sag between the wires of the fabric. This endless belt travels around the several rollers 24, 29, 33 and 34 and preferably the lower run 36 which travels under the roller 34 is adapted to rest upon and slide along the top surface of the bottom wall of the tank, as shown in Figure 2, so that the weight of this run of the belt rests on the bottom of the tank.

The upper run of the belt is sufficiently long, so that the portion lying between the roller 29 and the roller 33 will sag in the form of a loop by reason of its own gravity, as shown at 37. The short, straight upper run of the belt at 31 lying between the rollers 24 and 29 on which the pieces of dough are first fed, will not appreciably sag, but between the rollers 29, 33 the belt will sag in the form of the loop shown so that it dips some distance into the liquid; and at the end adjacent the roller 33 the belt runs out of the liquid while passing over this roller and deposits the pieces of dough upon a roller conveyor which delivers them to the oven conveyor 38.

The device for conveying the pieces of dough from the tank to the oven conveyor 38 is shown at the right in Figures 1 and 2. It comprises a series of rollers 39 placed parallel and close to each other and journaled in the arms 40 which are pivoted on the same shaft 8 on which the tank is pivoted. These rollers are arranged on an inclined plane so that the pieces of cooked dough as they leave the conveyor 30 at the roller 33 pass onto the tops of the rollers 39 and travel down their top surfaces until they are delivered onto the oven conveyor 38. The arms 40 are provided at their free ends with rollers 41 which ride upon the top of the oven conveyor 38.

The device for retaining the pieces of dough upon the tank conveyor is constructed as follows: There is a shaft 42 extending crosswise of the machine above the tank and journaled by means of the pointed pins 43 in the side plates 21 so that the shaft will turn freely. This shaft is provided with a number of sprocket wheels 44 spaced close to each other across the machine and they are positioned just over the portion of the belt conveyor 30 where the latter travels off the roller 29 and begins to form the slack loop.

Adjacent the opposite end of the machine there is a similar shaft 45 mounted by means of the pointed pins 46 to revolve between the plates 21; and this shaft has a number of sprockets 47 in horizontal alignment with the several sprockets 44, thereby forming, with the forward sprockets, a number of pairs. Over each pair of sprockets 44 and 47 there travels an endless chain 48 which is preferably of very light construction. The upper run of these chains is supported upon a supporting plate 49 disposed below the same in order to support the weight of this run and prevent it from sagging. The length of the endless chains is such that the lower run will sag in the form of a loop 50 and will rest on the loop 37 of the conveyor belt or close to it. I prefer that this upper device be made of a number of individual chains in order to limit the weight resting on the soft pieces of dough to the weight of the local portion of a single chain as this top pressure must be light in order to avoid disfiguring the pieces of dough.

The several conveyor members above described are operated as follows: The shaft 51 which extends crosswise of the machine is provided at one end with a sprocket 52 to which power for operating the machine may be applied. On this same shaft there is another sprocket 53 over which engages the endless chain 54 and this chain also engages over the sprockets 55 arranged on the extended ends of one-half of the shafts which carry the rollers 39 so that through the chain 54 the alternate rollers 39 are revolved.

At the opposite side of the machine there is another sprocket 56 on the shaft 51 over which engages the endless chain 57 and this chain travels around the sprockets 58 which are arranged on the extended ends of the shafts of the other half of the rollers 39.

In this manner alternate rollers 39 are driven from the chains 54 and 57. The reason for dividing the drive is to permit the rollers 39 to be placed closer together than they could be if the sprockets on their shafts were all arranged at one side of the machine.

On the main cross shaft 51 there is another sprocket 59 over which engages the endless chain 60. This chain extends to the left in Figures 1 and 2 and it passes around the sprocket 61 which is arranged on the end of the shaft on which the roller 24 is mounted whereby driving force is transmitted from the main shaft 51 to the roller 24 to operate the latter. The same chain travels to the right in Figures 1 and 2 and engages around the sprocket wheel 62 which is placed on the end of the shaft on which the roller 33 is mounted. This chain 60 therefore, serves to drive both the forward roller 24 and the rearward roller 33 around which the endless belt conveyor 30 travels. When the chain 60 is set upon the sprockets 61 and 62 it is engaged with the teeth thereof while the upper run of the belt 30 sags in a loop 37 and this loop will always be maintained while the machine is in operation.

There is a swinging arm 64 provided with a roller 65 to take up the slack in the chain 60. The upper run of the chain 60 passes under and meshes with the sprocket wheel 66 which is mounted on the end of the shaft 42 on which the several sprockets 44 are mounted. This chain, therefore, acts on this sprocket below the shaft 42 and serves to revolve it in order to propel the endless upper pressing members 48.

In order to put the machine into operation the cooking liquid is supplied to the tank 4 while the latter is in the position shown in Figure 2.

In this position the tank conveyor and the lower run of the upper pressing device are within the tank and portions thereof are below the liquid lever. The burners 19 are lighted to supply the heat necessary to heat the tank and its liquid for the purpose of cooking the dough as it is conveyed through the tank. The pieces of dough are fed onto the upper horizontal run 31 of the belt conveyor, as shown in Figure 2, this conveyor being driven by the driving mechanism above described and the upper run travels to the right in Figures 1 and 2. About the time the piece of dough on the belt passes the supporting roller 29 the belt starts to dip in the slack loop 37 and the slack loop 50 of one or more of the light chains 48 will begin to lay upon the top surface of the piece of dough. From then on the piece of dough will rest upon the belt 30 and one or more of the pressing chains 48 will rest upon the dough and all will travel to the right at the same speed. The dough will be carried into and through the liquid and will be immersed therein for a sufficient time for it to be cooked in accordance with the requirements. The piece of dough will travel down with the loop 37 and thence upwardly adjacent the outward end of the tank. At the end of the lower run of the chains 48 the latter will rise off the piece of dough and the latter will continue on the belt 30 until the latter travels over the roller 33 whereupon the piece of dough will be discharged upon the uppermost roller 39. As the several rollers 39 are all revolved in the same direction the piece of dough, which has now been cooked, and which is in more firm condition than when it was first introduced into the cooking tank will be caused by the revolving rollers 39 to travel down their tops and to discharge onto the conveyor 38 which is to take it through the baking oven.

While each piece of dough is on the belt 30 and engaged by the upper device only a limited number, sometimes one, of the slack loops 50 of the upper chains will rest on each individual piece of dough, so that the pressure on the dough will be very light, but at the same time sufficient to cause it to travel with the belt 30. If any individual piece of dough is thicker than another adjacent to it, the flexible chains 48 will simply bend or flex and accommodate themselves to the individual thickness of each piece of dough instead of pressing into it and disfiguring it. In this respect the present device is very flexible and is adapted to handle the pieces of dough without disfiguring them whereas any fixed device for pressing the pieces onto the conveying belt must necessarily either unduly press the thicker pieces of dough and disfigure them, or fail to contact with any which are below the required thickness. There may be many pieces of dough simultaneously fed on the belt across its entire width, so that the capacity of the machine is considerable. At different points across the belt the pieces of dough will be engaged independently by the slack runs 50 of the several chains 48 but the pressure on each piece will be light because each chain may flex independently of the other.

Whenever it is desired to drain the liquid from the tank the valve 9 may be opened to discharge the liquid into any suitable container and the lever arm 14 may be swung into the position shown in Figure 3 for the purpose of tilting the tank to discharge the liquid through the valve 9. In this operation only the tank and the burner are rocked leaving the operating portions of the mechanism intact. This also permits access to the operating mechanism for the purpose of cleaning the various parts.

In Figures 7 to 9 inclusive I have shown the machine modified for handling straight pretzels or bread sticks. Herein the tank and the heating means remain the same. The traveling support consists of chains 70 running parallel with each other over sprockets 71 disposed on the shaft 72. The sprockets 71 take the place of the rollers 24 of the first device. There are brackets 73 on the side links of these several chains to which are attached, as by rivets 74, the channel members 75 which extend across the several chains of the conveyor and are connected with brackets 73 on each chain. These channels form trough like compartments or pockets 76 for holding the straight, individual pieces 77 of dough which are to form pretzels or bread sticks. These might have a tendency to roll on the conveyor, especially after they are partially cooked, were they not disposed in the pockets 76 of the channels.

The upper chains 48 in this form of the invention may be the same as in the first form and they may be operated in the same manner. The loose, sagging run 50 of these upper chains need not come directly into contact with the strips 77 of dough, at least when the latter first enter the tank, but they rest by gravity on the tops of the channels 75 and prevent the strips of dough from being displaced from their individual pockets 76 in the several channels during the cooking operation. Except for the presence of the channels mounted on the chains to form separate pockets for the pieces of dough, this device operates the same as the one first described.

The pieces or strips of dough are fed singly into the pockets 76 of the channels while they are traveling toward the roller 29. When the chains 70 travel down to form the sagging loop 78 the loose or sagging runs 50 of the upper chains rest on the top edges of the channels 75 and prevent the displacement of the pieces of dough from the pockets 76 during the cooking operation. But the chains do not have to rest upon the pieces of dough as they rest upon the channels and merely prevent the strips of dough from being displaced from their several pockets 76.

Having described my invention, what I claim is:

1. In a cooking machine the combination of a tank for holding a cooking fluid, and means for conveying articles to be cooked through the liquid in said tank, comprising a flexible, traveling support having a loose slack run dipping into the liquid in said tank, and adapted to convey the articles to be cooked into and out of the liquid in said tank, and means for holding said articles from displacement on said conveying means and comprising a plurality of flexible, endless members each having a loose or slack run adapted to individually droop by gravity and to rest on the articles supported on said conveying means and means for driving said conveying means and said holding means at substantially the same speed.

2. In a cooking machine the combination of a tank for holding a heated cooking fluid and means for conveying articles to be cooked through the liquid in said tank, comprising a flexible driving support having a free, drooping run projecting into the liquid in said tank and adapted to support the articles to be cooked thereon, and to convey the same into and out of the liquid in said tank, and means for holding said articles from displacement on said conveying means and comprising spaced, revolvable members, a plurality of flexible, endess members traveling around said revolvable members and each having a loose, drooping lower run adapted to rest on said conveyor and to prevent displacement of the articles thereon, and means for driving said conveying means and said holding means at substantially the same speed.

3. In a cooking machine the combination of a tank for holding a heated cooking fluid, and means for movably supporting said tank, means for conveying articles to be cooked through the liquid in said tank, and means for supporting said conveying means independently of said tank, whereby the tank may be moved without displacing said conveying means.

4. In a cooking machine the combination of a tank for holding a heated cooking fluid, means for pivotally supporting said tank adjacent one end, heating means attached to and movable with said tank, means for conveying articles to be cooked through the liquid in said tank and means for supporting said conveying means independently of said tank whereby the tank may be rocked on its pivot independently of said conveying means.

IRWIN ELLIOTT.